(12) United States Patent
Roark et al.

(10) Patent No.: US 10,464,017 B2
(45) Date of Patent: Nov. 5, 2019

(54) KILN BAGHOUSE WITH DYNAMICALLY SELECTABLE AND RECONFIGURABLE POLISHING AND NON-POLISHING OPERATIONS

(71) Applicant: GCC OF AMERICA, INC., Denver, CO (US)

(72) Inventors: Steven Douglas Roark, Parker, CO (US); Gina Nance, Colorado Springs, CO (US)

(73) Assignee: GCC OF AMERICA, INC., Denver, CO (US)

( * ) Notice: Subject to any disclaimer, the term of this patent is extended or adjusted under 35 U.S.C. 154(b) by 0 days.

(21) Appl. No.: 16/034,127

(22) Filed: Jul. 12, 2018

(65) Prior Publication Data

US 2018/0318757 A1 Nov. 8, 2018

Related U.S. Application Data

(62) Division of application No. 14/616,529, filed on Feb. 6, 2015, now Pat. No. 10,022,666.

(60) Provisional application No. 61/936,852, filed on Feb. 6, 2014.

(51) Int. Cl.
*B01D 53/02* (2006.01)
*B01D 53/30* (2006.01)
*B01D 53/10* (2006.01)

(52) U.S. Cl.
CPC ............. *B01D 53/30* (2013.01); *B01D 53/10* (2013.01); *B01D 2253/102* (2013.01); *B01D 2257/602* (2013.01); *B01D 2258/0233* (2013.01); *B01D 2259/402* (2013.01)

(58) Field of Classification Search
CPC ........ B01D 2253/102; B01D 2257/602; B01D 2258/0233; B01D 2259/402; B01D 53/10; B01D 53/30
See application file for complete search history.

(56) References Cited

U.S. PATENT DOCUMENTS

| 7,033,548 | B2 | 4/2006 | Pahlman et al. |
| 7,854,789 | B1 | 12/2010 | Vidergar |
| 2003/0157008 | A1 | 8/2003 | Pahlman et al. |
| 2008/0210089 | A1 | 9/2008 | Tsangaris et al. |
| 2010/0024639 | A1* | 2/2010 | Taylor ................ B01D 46/0032 95/2 |

* cited by examiner

*Primary Examiner* — Christopher P Jones
(74) *Attorney, Agent, or Firm* — Lewis Roca Rothgerber Christie LLP

(57) ABSTRACT

The present invention is an apparatus and method having dynamically reconfigurable air flow paths for supporting polishing and non-polishing operations. The invention includes a first baghouse section and a second baghouse section coupled to the first baghouse section via conduit. A set of valves is disposed along the conduit to direct air flow through the baghouse apparatus. A controller configures the baghouse apparatus by actuating at least one valve in the set of valves. The controller automatically configures the baghouse apparatus in either a polishing operation or a non-polishing operation based on a predetermined criteria.

6 Claims, 7 Drawing Sheets ized by the present inventors, new
systems and processes are needed to utilize the benefits of
polishing baghouses while reducing the capital costs and
expenses associated with conventional polishing baghouses.

KILN BAGHOUSE WITH DYNAMICALLY SELECTABLE AND RECONFIGURABLE POLISHING AND NON-POLISHING OPERATIONS

CROSS-REFERENCE TO RELATED APPLICATIONS

This application is a divisional of U.S. patent application Ser. No. 14/616,529, filed on Feb. 6, 2015, which claims the benefit of and priority to U.S. Provisional Application No. 61/936,852, filed on Feb. 6, 2014, the disclosures of each of which are incorporated herein by reference.

BACKGROUND

Field of Invention

The present invention relates, in general, to cement manufacturing facilities that utilize baghouses (dust collectors) to con-currently control particulate matter and certain other emissions. Other processes in which this invention can apply include lime manufacturing, pulp and paper, electric power generation, and other similar industries.

Description of the Related Art

In the cement manufacturing industry, the recently promulgated Portland Cement National Emissions Standards for Hazardous Air Pollutants (PC NESHAP) has forced most plants into significant capital investments to comply with new and more strict emissions standards relating to Mercury (Hg), Hydrochloric Acid (HCl), Total Hydrocarbons (THC), Particulate Matter (PM) and Dioxin-Furans (D/F). In the case of mercury, the PC NESHAP standard is 55 lbs Hg/million tons clinker for existing plants and 21 lbs Hg/million ton clinker for new plants, measured on a 30-day rolling average. Clinker is the intermediate product after the pyro-processing step in the cement manufacturing process.

One general problem that cement manufacturing companies and plants face is achieving compliance with these rules, regulations, permits, etc. in a cost-effective manner. Conventional treatment options available for plants that currently cannot achieve the above Hg standard include: 1) switching of raw materials or fuel to a lower mercury material, 2) dust shuttling which entails removal or purge of material from a point in the process in which mercury is concentrated (such as the main kiln baghouse), or 3) sorbent injection (typically Activated Carbon) and material removal. Similar situations exist when controlling other pollutants such as Hydrochloric Acid (HCl) and Sulfur Dioxide ($SO_2$).

Removal of pollutants such as mercury using activated carbon injection ("ACI") is typically accomplished by methods including: 1) capturing mercury from process gas streams typically in a main kiln baghouse using activated carbon injection. Sorbents such as activated carbon are injected into the main kiln baghouse, mercury attaches to the activated carbon, then absorbed/adsorbed mercury is removed along with certain amounts of kiln raw meal material. This removed material is typically disposed or recycled into other parts of the process, such as a material into the finish milling process or cement. Another method includes 2) injection of activated carbon injected into a 'Polishing Baghouse'. A Polishing Baghouse is a separate baghouse installed in series (after) the main kiln baghouse. The Polishing Baghouse approach provides a greater potential for mercury removal as it provides a means to perform ACI during all phases of operation (mill-on or compound operation and during mill-off or direct operation). For in-line raw mill systems, it is not possible/practical to waste large amounts of material captured in the main baghouse during "raw mill on" operation, as that material is recycled/used as feed for the pyro-processing of materials into a cement clinker. The Polishing Baghouse also allows for high capture rates of mercury per unit of activated carbon because the unit receives a 'clean' airstream (free of particulate matter). This 'clean' airstream allows reduced frequency of bag cleaning cycles, which means the carbon can stay in place for longer periods allowing more mercury capture per unit of carbon, when compared with the first capturing method described above. Additionally, the available surface area for mercury capture is generally much higher with a Polishing Baghouse, as a thicker filter cake of carbon is more economically maintained on the filter bags.

However, Polishing Baghouses involve high capital investment and operating costs, because it basically duplicates the very expensive main baghouse system.

Accordingly, as recognized by the present inventors, new systems and processes are needed to utilize the benefits of polishing baghouses while reducing the capital costs and expenses associated with conventional polishing baghouses.

SUMMARY OF THE CLAIMED INVENTION

One embodiment of the present invention is a baghouse apparatus having dynamically reconfigurable air flow paths for supporting polishing and non-polishing operations. The apparatus includes a first baghouse section, a second baghouse section coupled to the first baghouse section via conduit, a set of valves disposed along the conduit to direct incoming air flow through the baghouse apparatus, and a controller that configures the baghouse apparatus by actuating at least one valve in the set of valves. The controller configures the baghouse apparatus in either the polishing operation or the non-polishing operation based on whether the incoming air flow exceeds or is below a predetermined criteria. The non-polishing operation has the first baghouse section in a parallel configuration with the second baghouse section. The polishing operation has the first baghouse section in a series configuration with the second baghouse section. A sorbent injection module is optionally coupled to the second baghouse section. The sorbent injection module can inject activated carbon into the second baghouse section when the baghouse apparatus is in the polishing operation. The predetermined criteria can be, for example, an acceptable level of emissions in the air flow. The controller configures the first baghouse section and the second baghouse section in series if an emission level of the incoming air flow exceeds the predetermined criteria. The controller can include inputs for determining whether the incoming air flow exceeds or is below the predetermined criteria. The inputs can include data and sensor readings. The set of valves can include electromechanical valves. The baghouse apparatus of this embodiment can optionally include a third baghouse section.

Another embodiment of the present invention is a method for dynamically selecting polishing and non-polishing operations in a baghouse apparatus. This method includes receiving air flow through conduit and determining if a component of the incoming air flow exceeds a predetermined criteria. If the component exceeds the predetermined criteria, then the baghouse apparatus is configured with a first baghouse section and a second baghouse section in the polishing operation. If the component does not exceed the predetermined criteria, then the baghouse apparatus is configured with the first baghouse section and the second baghouse section in the non-polishing operation. The baghouse apparatus is then operated in the selected configuration. In this method, the polishing operation is when the first baghouse and the second baghouse are operated in series. The non-polishing operation, on the other hand, is when the first baghouse and the second baghouse are operated in parallel. This method can optionally include injecting activated carbon into the second baghouse section when configured in a series configuration. In one example, the component can be an emission level and the predetermined criteria is an acceptable level of emission. The configuring step includes actuating one or more valves in a set of valves using a controller. This method can also include automatically switching configurations of the first and the second baghouse when a controller detects that the component of the incoming air flow changes and either no longer exceeds the predetermined criteria or begins to exceed the predetermined criteria. The automatically switching step includes actuating at least one valve in a set of valves.

DETAILED DESCRIPTION

Figure 1:
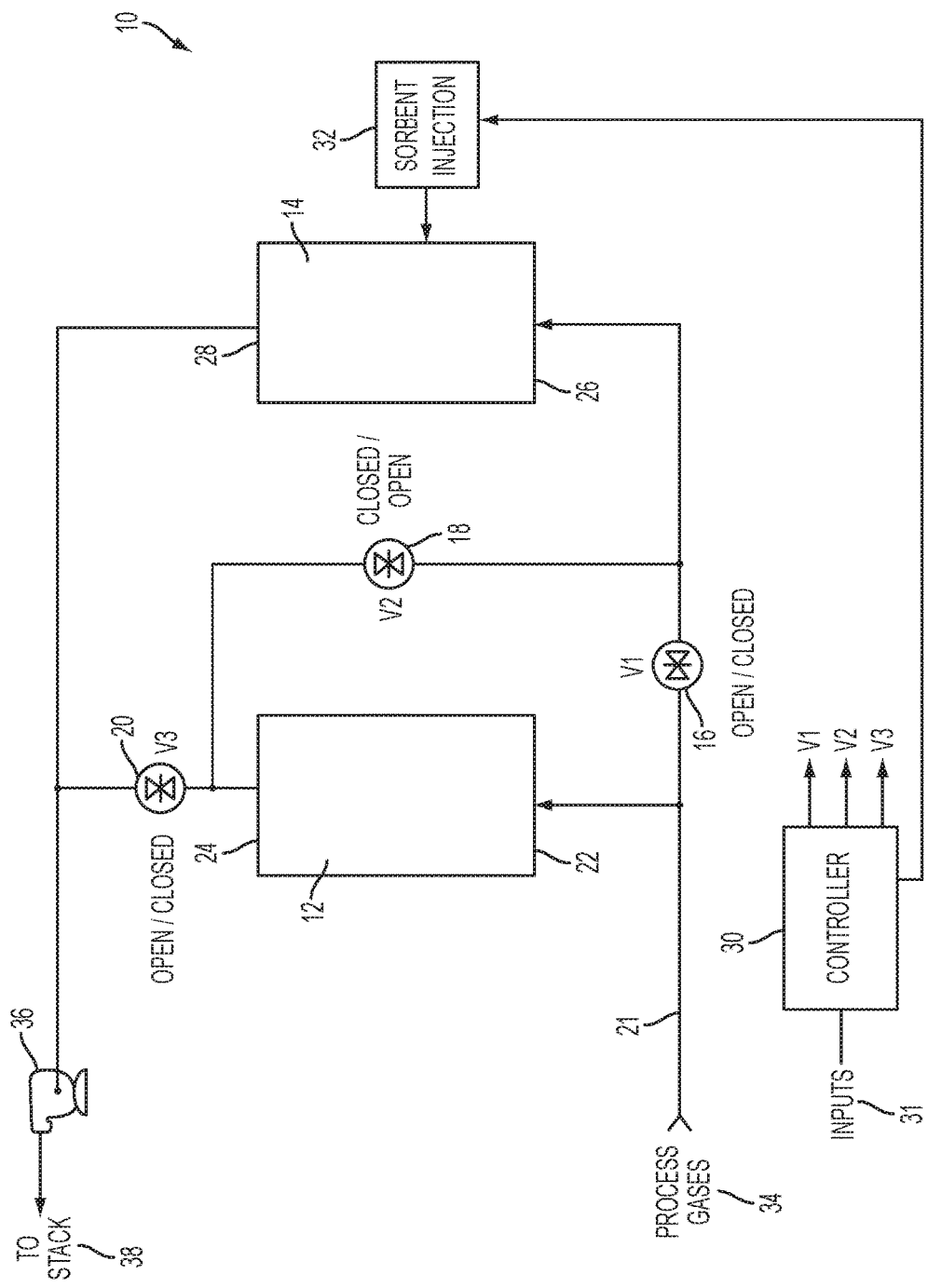
FIG. 1 illustrates a block diagram of an example system having reconfigurable air flow paths to support polishing and non-polishing operations, in accordance with one embodiment of the present invention.

Disclosed herein are various embodiments of systems, processes, and modules for baghouses with dynamically selectable and reconfigurable polishing and non-polishing operations that can be used in conjunction with a cement manufacturing plant or facility to control emissions.

In one example, innovative process flow flexibility provides a method in which the main kiln baghouse can alternate operating scenarios including: 1) Operating in a 'normal' main kiln baghouse mode in which all process gases pass through all baghouse modules in parallel, then exit through fans and ductwork to the main kiln exhaust stack; and 2) Through process flow flexibility, allow process exhaust gases to pass through a portion of the main kiln baghouse. A portion or all process gases are then directed to the other portion of the main baghouse 'In Series'. Then all gases combine and are directed to the main kiln exhaust stack. By directing process gases in this approach, one section of the main kiln baghouse performs in a 'Polishing Baghouse' mode. This added process flexibility provides a method of achieving higher levels of mercury removal on-demand and during many possible operating scenarios. This is helpful for operations that experience significant variability in the mercury inputs into the process. When mercury inputs are low enough to achieve compliance with emissions standard without treatment, or when only low-level treatment is needed using dust shuttling or ACI-enhanced dust shuttling, all process gases pass through the baghouse in parallel. In this scenario, light-loading of the baghouse results in reduced operating cost as time between cleaning cycles is typically less frequent. When mercury inputs are higher, a portion of the main baghouse operates in series as a 'Polishing Baghouse'. Activated carbon is focused on the downstream (polishing) baghouse modules to achieve higher level of mercury reduction. Embodiments of the invention are particularly attractive to operations that only occasionally have higher mercury, or other controlled pollutant, emissions. The much higher investment of a true Polishing Baghouse is avoided, while still providing a method of significantly higher emissions reduction, as needed. Additionally when operating in series in a polishing baghouse mode, sorbents such as activated carbon, realize a higher capture percentage as carbon can remain on the filter bags for extended periods of time as cleaning cycle frequency can be greatly reduced. This is accomplished because the gases directed to the 'polishing' section of the baghouse, are very clean (dust-free) gases, as they were pre-filtered in the initial sections of the baghouse. The reduced cycle times along with the relative clean gases, result in significantly reduced amounts of material requiring disposal or recycle, after pollutant (mercury) removal.

In one example, flexibility is provided to operate the main kiln baghouse either completely in parallel, which is considered 'normal' cement plant operations, or to switch operations to run certain modules of the main kiln baghouse in series. Operating these modules in series affectively places a section of the baghouse in 'normal' cement operating mode, and the other modules operating in a 'Polishing Baghouse' mode of operation. In one example, the modules that operate in Polishing mode are equipped with sorbent injection equipment. Modules that remain in 'normal' operating modes can be equipped with sorbent injection equipment, or not. This choice is site-specific, and does not materially change the spirit of the invention.

Embodiment of the invention can be used when adding new baghouse modules to an existing facility, or to modify existing baghouse modules to allow routing of process flows from certain module(s) exit gases, into the other modules. In one example, the downstream modules can be equipped with activated carbon (or other sorbents) capability. For modern cement plant with in-line raw mills, ACI can be employed in both Raw Mill-On and Raw Mill-Off operating scenarios. Much advantage is provided by embodiments of the present invention for those processes in which emissions standards are not achieved during the Raw Mill-On scenario. For those facilities in which high emission levels are only occasionally occurring, embodiments of the invention provide flexibility without the additional large investment of a separate Polishing Baghouse. During periods in which emissions levels are only moderately above the regulatory standards, the modules can run in parallel and activated carbon and/or dust shuttling can be performed during the Raw Mill-Off operations.

Embodiments of the invention provide the flexibility for high levels of emissions reductions, without making the investment associated with the higher mercury level reduction systems. The invention also provides the ability to more precisely control to a specific emissions level as adjusting actuators which direct process flows, can be positioned to control precise amounts of gases to or around the polishing mode modules. Advanced process control is possible to determine gas proportioning, in those cases in which pollutant emissions are continuously monitored.

Other embodiments of the disclosure are described herein. The features, utilities and advantages of various embodiments of this disclosure will be apparent from the following more particular description of embodiments as illustrated in the accompanying drawings.

In one example, a system including one or more baghouses (or sections or portions of baghouses) is provided with reconfigurable air flow paths to support both polishing and non-polishing operations. In one example, in a first mode, the airflow paths are configured so that process gases and materials flow into and through the baghouses in parallel (which can be utilized as a normal mode of operation). In a second mode, which can be used in a polishing mode of operation, the airflow paths are configured so that process gases and materials flow into and through the baghouses in series, and the downstream baghouse section is configured to operate as a polishing baghouse that can include sorbent injections such as activated carbon injections. A controller can be provided to selectively and dynamically configure the system in either the first normal mode or the polishing second mode, wherein the controller selects the operational modes based on factors such as emissions levels, process conditions, operating conditions, or other factors. In this manner, embodiments of the present invention offer the benefits of polishing baghouses without requiring the capital expenditures associated with adding dedicated stand-alone polishing baghouse. Various embodiments of the present invention are disclosed herein.

In FIG. 1, an example system 10 is shown having reconfigurable air flow paths to support polishing and non-polishing operations, in accordance with one embodiment of the present invention. Reconfigurable system 10 includes a first baghouse section 12 and a second baghouse section 14. Baghouse sections 12 and 14 may be complete baghouses, or sections or portions of baghouses (the terms baghouse, baghouse section, and baghouse portion are used interchangeably herein, with the understanding that embodiments of the invention can be utilized with entire baghouses, or portions or sections thereof).

A set of valves 16, 18, and 20 (also shown as valves V1, V2, V3), along with conduits 21, are utilized to direct airflow selectively through baghouse sections 12, 14 depending upon the desired mode of operation. Baghouse 12 has input 22 and output 24, and baghouse 14 has input 26 and output 28. Valves 16, 18, and 20 may be electromechanical valves or motor valves, in one example.

A controller 30 is provided with controls valves 16, 18 and 20. Controller 30 may be implemented using a programmable logic controller, microprocessor, computing device, or other process control device. In one example, controller 30 has inputs 31, which may include but are not limited to data, sensor readings, or other information relating to factors such as emissions levels, process conditions, operating conditions, or other factors. The controller 30 may include one or more modules or computer program code to implement one or more of the process steps, features, or functions disclosed herein. Controller 30 may include one or more communication interfaces, for communications over wired or wireless networks; and other conventional computing accessories such as displays, keyboards, mobile device interfaces, etc. can be provided and coupled with controller 30.

In one example, one or more sorbent injection modules 32 can be provided and coupled with baghouse section 14. Sorbent injection module 32 can for instance be configured to inject activated carbon into baghouse section 14, on demand under the control of controller 30, for instance during a polishing operation mode or cycle. In one example, when the system 10 is operating in a normal, non-polishing mode, the sorbent injection module 32 can be disabled, which thereby can help control costs associated with use of activated carbon or other sorbents.

In one example, the system 10 is configured to receive process gases, airflow and/or materials 34 from a cement manufacturing facility or process. The system 10 generates clean gases that can be passed through one or more fans 36 to a stack 38, in on example.

In FIG. 1, one example is shown of a configuration of interconnections between baghouses 12, 14. In this example, baghouse 12 receives at its input 22 process gases 34 directly through conduit 21. Valve 16 is coupled between the inputs 22 and 26 of baghouses 12 and 14, and valve 18 is coupled between the output of valve 16 and the output 24 of baghouse 12. The input of valve 20 is coupled with the output 24 of baghouse 12 and is also coupled with the output of valve 18. The output of valve 20 is coupled with the output 28 of baghouse 14, which directs airflow of clean gases to fan 36 to stack 38. It is understood that other configurations of system 10 are possible, depending for instance on the number of baghouses/sections/portions used.

Figure 2:
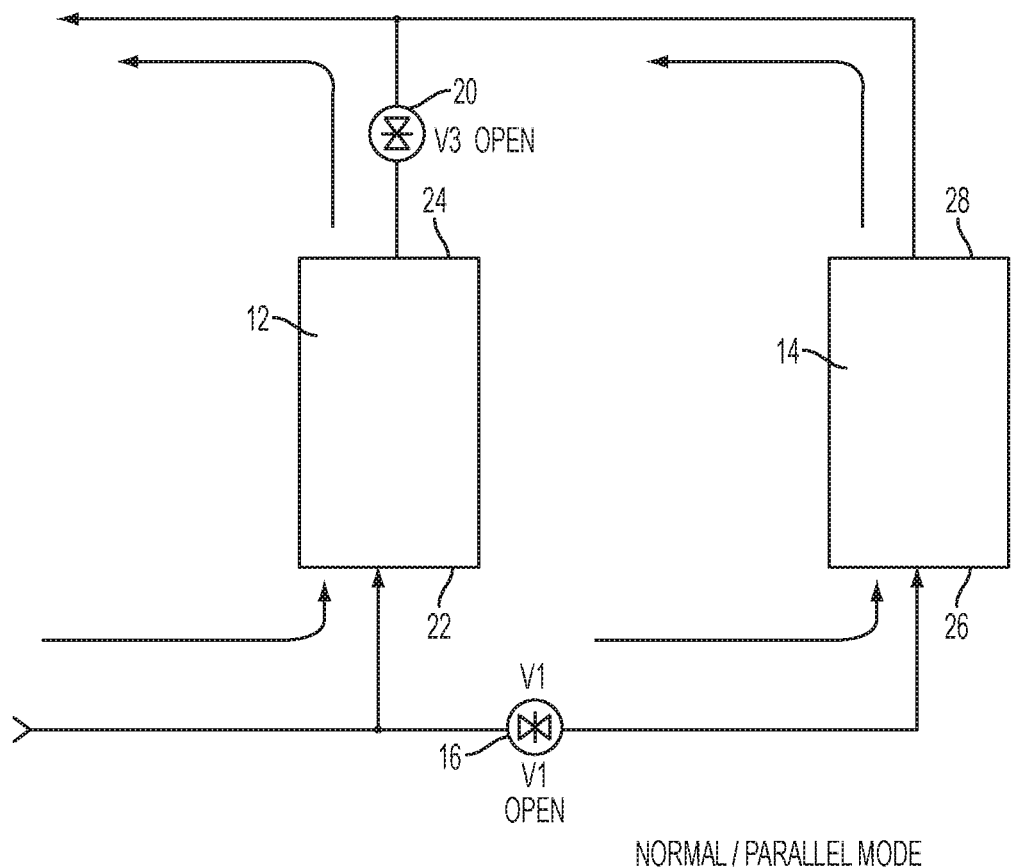
FIG. 2 illustrates a block diagram of the example system of FIG. 1, wherein the system is configured for non-polishing operations in a parallel configuration, in accordance with one embodiment of the present invention.

Referring to FIG. 2, system 10 is configured for non-polishing operations in a parallel configuration, in accordance with one embodiment of the present invention. In this example, valves 16 and 20 are opened, and valve 18 is closed. In this manner, baghouses 12, 14 both receive dirty process gases 34 at their respective inputs 22, 26; and baghouses 12, 14 process and clean in parallel gases 34. The outputs 24, 28 of baghouses 12, 14 (which now contain clean gases) are directed to the stack 38. In one example, this parallel mode of operation of baghouses 12, 14, may be implemented as a normal operating mode of system 10.

Figure 3:
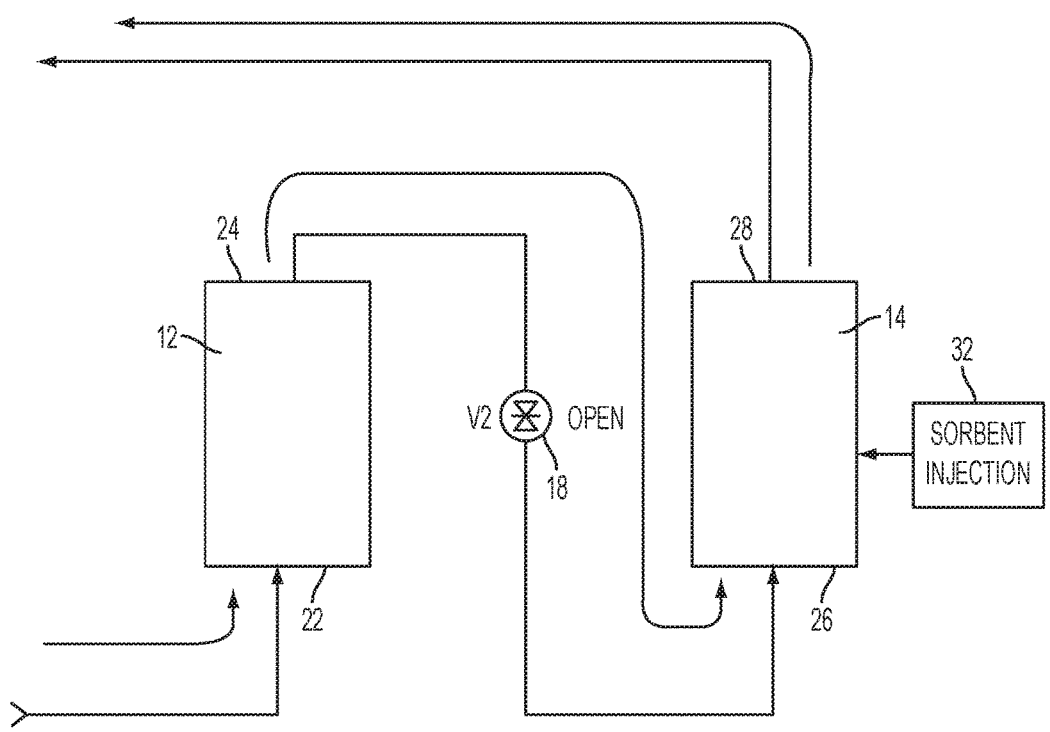
FIG. 3 illustrates a block diagram of the example system of FIG. 1, wherein the system is configured for polishing operations in a series configuration, in accordance with one embodiment of the present invention.

Referring to FIG. 3, system 10 is configured for polishing operations in a series configuration, in accordance with one embodiment of the present invention. In this example, valve 18 is opened, and valves 16 and 20 are closed. In this manner, baghouse 12 directly receives dirty process gases 34 at its input 22, and baghouse 12 performs a first phase of cleaning gases 34. In this configuration, the output 24 of baghouse 12 is coupled with the input 26 of baghouse 14 such that baghouse 14 is now downstream of baghouse 12. Baghouse 14 can receive one or more sorbent injections (such as activated carbon), so as to provide a second phase of cleaning the gases output from baghouse 12. The output 28 of baghouse 14 (which now contain clean gases that have been processed by the series combination of baghouse 12 then baghouse 14) is directed to the stack 38. In one example, this series mode of operation of baghouses 12, 14, may be implemented as a "polishing" operating mode of system 10, used to selectively provide the functionality of a polishing baghouse in the second baghouse 14.

The controller 30 can cycle between the normal operations/mode/configuration of FIG. 2 and the polishing operations/mode/configuration of FIG. 3, depending upon various conditions, or factors. As one non-limiting example, when used with a cement manufacturing facility, the normal operations may be utilized during periods of low mercury inputs into the manufacturing process times, and the polishing operations may be utilized during periods of higher mercury inputs into the manufacturing process times.

Figure 4:
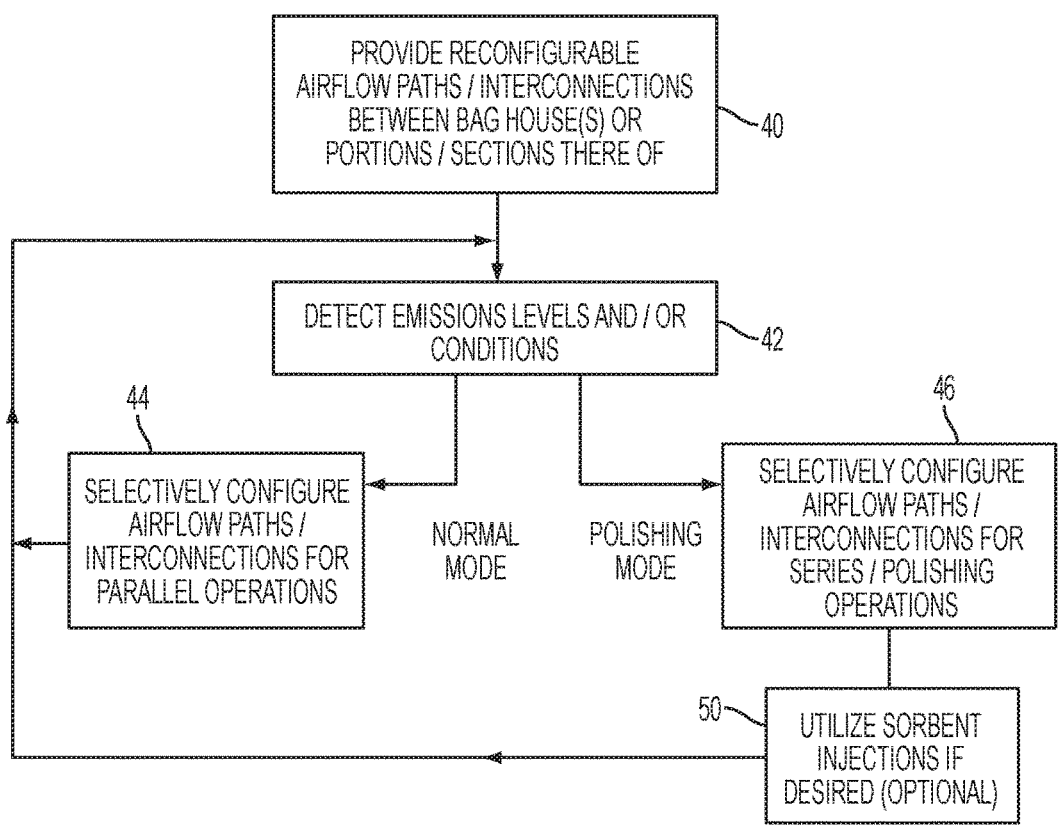
FIG. 4 illustrates an example of a process, in accordance with one embodiment of the present invention.

FIG. 4 illustrates an example of a process for dynamically selectable and reconfigurable polishing and non-polishing operations that can be used in conjunction with a cement manufacturing plant or facility to control emissions, in accordance with one embodiment of the present invention. One or more of the operations described with reference to FIG. 4 can be implemented within system 10, for instance within controller 30, depending upon the particular implementation.

At operation 40, reconfigurable airflow paths/interconnections are provided between baghouses or portions/sections thereof. At operation 42, emission levels and/or other conditions, inputs, sensor data, or other information are examined or detected.

Figure 5:
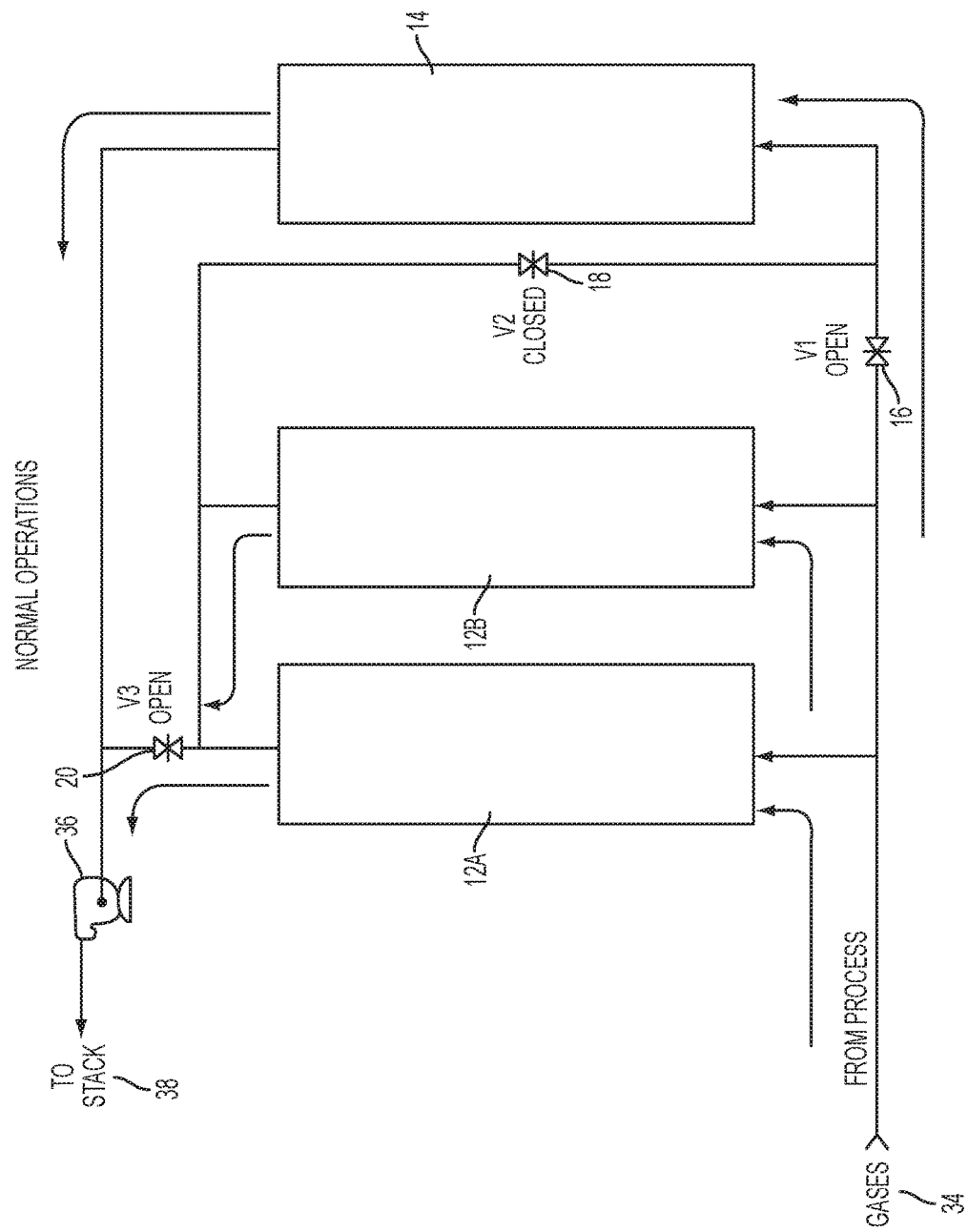
FIG. 5 illustrates a block diagram of another example system, wherein the system is configured for non-polishing, normal operations in a parallel configuration, in accordance with one embodiment of the present invention.

In one example, if emission levels are within acceptable levels, then control is passed to operation 44 to select normal operating modes for control of emission levels. Operation 44 may selectively configure airflow paths and interconnections between baghouses for parallel operations, for instance as illustrated in FIGS. 2 and 5.

Figure 6:
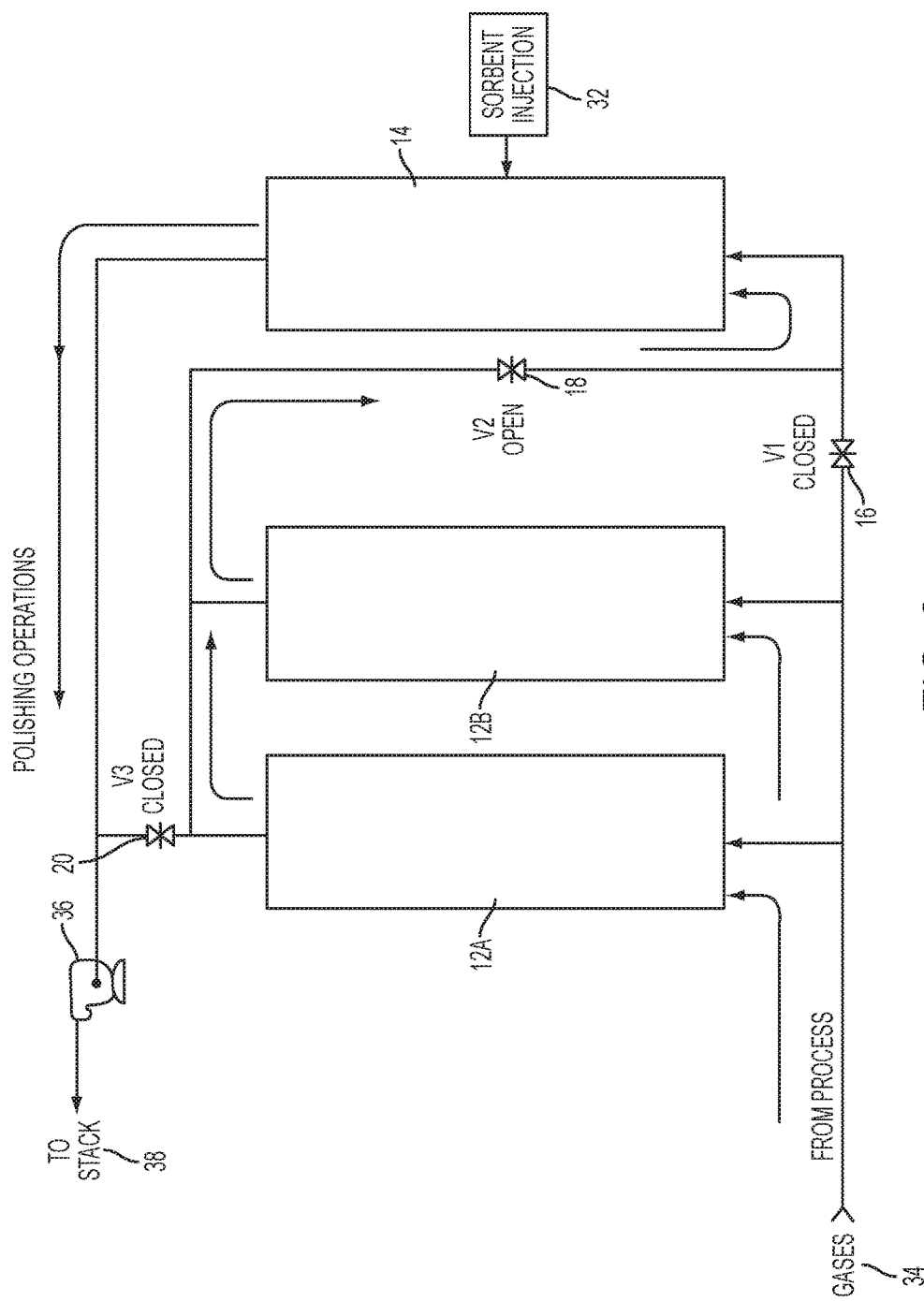
FIG. 6 illustrates a block diagram of the example system of FIG. 5, wherein the system is configured for polishing operations including a series configuration, in accordance with one embodiment of the present invention.

If emission levels are approaching or have reached unacceptable levels, then control is passed to operation 46 to initiate the polishing mode in order to reduce emission levels to acceptable levels and/or contain emission within acceptable levels. Operation 46 may selectively configure airflow paths and interconnections between baghouses for series operations, for instance as illustrated in FIGS. 3 and 6. In one example, operation 50 utilizes sorbent injections into one or more of the baghouses during polishing operations. In one example, sorbent injections are made into a downstream baghouse, for instance into a baghouse which is last in line prior to the output gases being passed to the stack. In another example, sorbent injections may be utilized in other bag houses as desired during polishing operations.

In one example, upon completion of operations 44 or 50, control is returned to operation 42 to repeat the process. As described above, various configurations of baghouses sections/portions/interconnections to facilitate reconfigurable airflow paths are contemplated by this disclosure. FIG. 5 illustrates another example system having three baghouses 12A, 12B and 14. In FIG. 5, the system is configured for non-polishing, normal operations in a parallel configuration, in accordance with one embodiment of the present invention, with valves 16 and 20 being open and valve 18 being closed. In FIG. 6, the system is configured for polishing operations including a series configuration, with valves 16 and 20 being closed and valve 18 being open. The sorbent injection module 32 can be activated as desired to inject sorbents into baghouse 14 to aid in polishing operations.

In one example, the downstream baghouse 14 can include a higher air:cloth ratio than baghouse 12, thereby resulting in a smaller unit than baghouse 12, since the airstream is generally cleaner when it reaches baghouse 14.

In another example, baghouse 14 is designed as the Polishing portion of the system, while baghouse 12 is designed as a non-polishing unit. In this manner, when baghouse 14 operates in a polishing mode, it has minimal effects on the production levels of the process, but may require an increased frequency of bag cleaning cycles in some or all of the baghouse modules.

In another example, the size of the baghouse/section/portion used in the Polishing Baghouse mode can be varied. Depending on the size and the proportioning of the baghouse, effects on production rates and on baghouse cleaning cycles can vary. Under certain arrangements, it may be advantageous to reduce production during time of the Polishing Baghouse operating scenario in order not to reduce the frequency of baghouse cleaning cycles. In one example, the system and the operating scenarios are configured in such a ways as to minimize any effect on production levels during polishing mode, which may result in low frequency of cleaning cycles and extended bag life of the baghouse filter media, during parallel operations.

In another example, sorbent injection modules may be provided for only a portion of the baghouse, as opposed to the entire baghouse. For instance, activated carbon injection capability can be provided to the baghouse modules that are used in the Polishing Baghouse operating scenario. If desired, ACI can be activated in the non-Polishing Baghouse operating scenario.

In another example, dust shuttling or dust purging can be accomplished in the polishing baghouse modules and/or the non-polishing baghouse modules.

An embodiment of the invention allows a configurable system design in which combinations of no control, dust shuttling or dust purging, and sorbent injection are available for both polishing and non-polishing modes, and during Raw Mill On and Raw Mill Off operations. This provides flexibility to precisely control emissions level at the kiln stack while greatly reducing capital investment associated with other advanced system designs.

Table I illustrates an example of operating scenarios for some embodiments of the present invention, shown as "Flex Modules." The configurable nature of the invention provides the ability utilize multiple operating modes to precisely control level of emissions. Table 1 summarizes a number of those possible modes, which include.

a. Raw Mill On
  i. Run all modules in parallel with no control (dust shuttling or sorbent inject). This mode is used when uncontrolled emissions are low enough to meet the compliance and internal standards of the facility.
  ii. Operate a portion of the baghouse modules in polishing mode in which unfiltered process gases enter a portion of the baghouse modules and filter the particulate matter. Some or all of the exhaust gases exiting these modules are directed to other baghouse modules in which activated carbon or other sorbents are utilized to remove other pollutants.
  iii. The $3^{rd}$ and $4^{th}$ scenario in raw mill on operation describes the ability to add activated carbon to all modules, in both 'parallel' or 'in-series' operations.
b. Raw Mill Off
  i. For raw mill off, and operation of all baghouse module 'In Series', the invention allows the possibility to use no control options in the traditional baghouse module, while having the possibility to operate the 'Flex Modules, in 3 different modes including 1) No control; 2) Dust shuttling scenario; or 3) Activated carbon injection.
  ii. Additionally when using no control option in the traditional mode, the invention allow the flex module to operate 'In Series' with sorbent injection for added control of pollutants.
  iii. The invention provides the option to operate all modules in parallel, while utilizing dust shuttling in all modules.
  iv. Alternately in parallel mode or 'In-Series' mode, the inventions allows flexibility to utilize dust shuttling for the traditional modules and utilize sorbent injection (ACI) in the flex modules.

v. The invention allows flexibility to utilize ACI in the traditional baghouse modules while utilizing ACI in the flex modules for both 'Parallel' and 'In Series' operations.

vi. Lastly, the invention flexibility allows, though it is not foreseen, to utilize ACI in the traditional modules, while utilizing dust shuttling in the flex modules, and while operating in the 'In-Series' configuration.

TABLE 1

Comparison of Traditional Baghouse to Flexible Baghouses

| | TRADITIONAL MODULE(S) | | | FLEX MODULE(S) | | | | |
|---|---|---|---|---|---|---|---|---|
| | No Control | Dust Shuttle | ACI | Parallel | Series | No Control | Dust Shuttle | ACI |
| Raw Mill On | X | | | X | | X | | |
| | X | | | | X | | | X |
| | | | X | X | | | | X |
| | | | X | | X | | | X |
| Raw Mill Off | X | | | X | | X | | |
| | X | | | X | | | X | |
| | X | | | X | | | | X |
| | X | | | | X | | | X |
| | | X | | X | | | X | |
| | | X | | X | | | | X |
| | | X | | | X | | | X |
| | | | X | X | | | | X |
| | | | X | X | | | X | |
| | | | X | | X | | | X |

Referring to Table I, when flex module(s) are in series, all of the flow can be routed from the traditional module(s) to the flex module(s), or only a partial flow can be routed to the flex modules with the remaining flow routed directly to the kiln stack. Meaning that it is possible to bypass some (or all) of the discharge gases from the traditional module(s), around the flex module(s).

Figure 7:
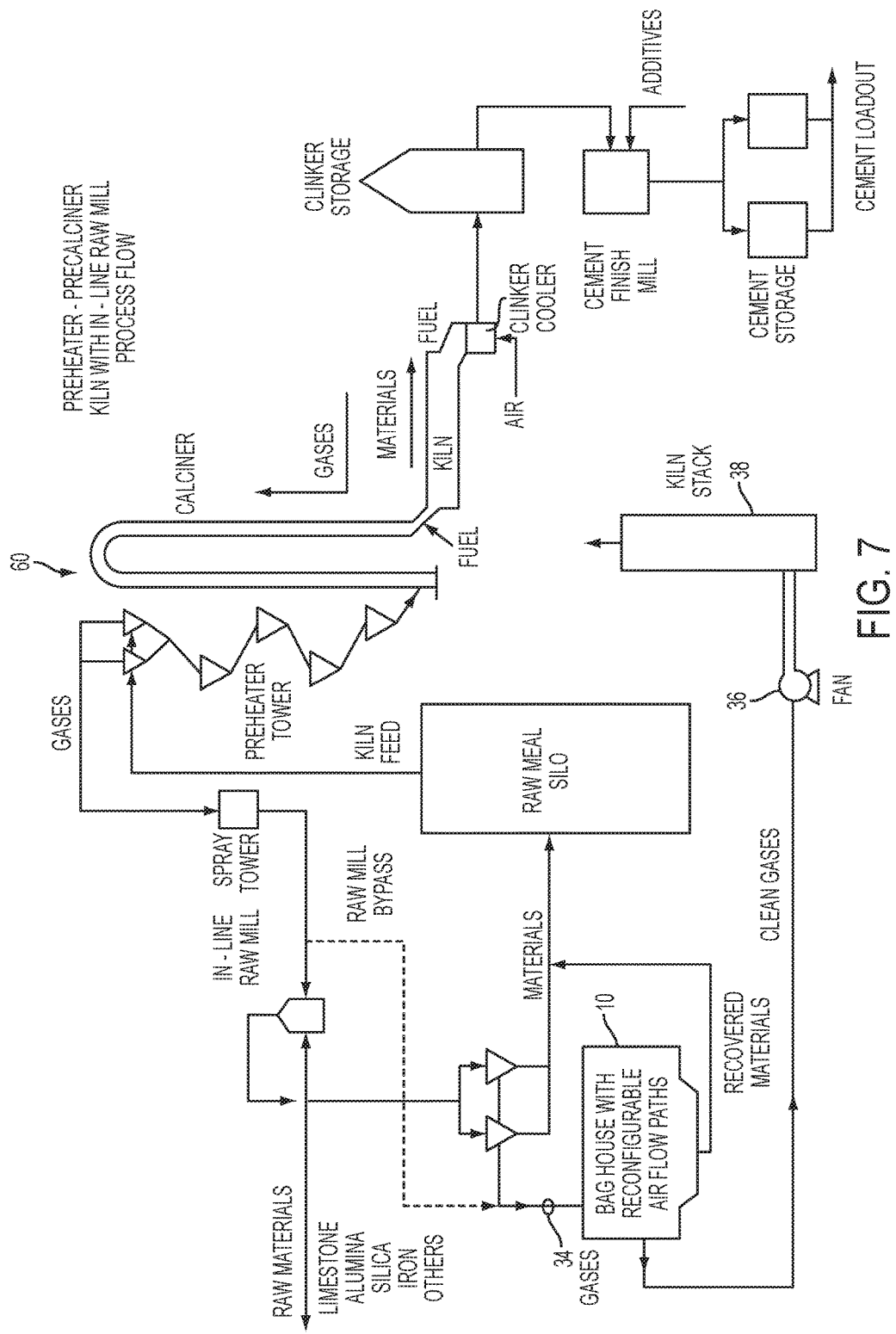
FIG. 7 illustrates a block diagram of an example of a cement manufacturing facility incorporating an embodiment of the present invention.

Embodiments of the present invention can be utilized in a wide variety of cement manufacturing facilities. FIG. 7 illustrates a block diagram of an example of a cement manufacturing facility incorporating an embodiment of the present invention. It is understood that FIG. 7 is provided by way of example only, and that embodiments of the present invention can be used with other configurations of cement manufacturing facilities or plants.

In FIG. 7, a cement plant includes a preheater-precalciner tower to prepare kiln feed ahead of introduction into the rotary kiln, and an in-line raw mill for drying and sizing feed material, which utilizes heat exhausted from the pyro-process. Clinker is then produced from this system as an intermediate product ahead of final grinding into Portland cement. A clinker cooler is utilized to recover heat from the produced clinker. This process can be fired with a number different fuels, with the most common being coal, petroleum coke, natural gas or fuel oil as traditional fuels. Additionally, a vast array of alternate fuels and raw materials can be utilized to make quality cement clinker.

An overview of the process for manufacturing cement begins with raw materials, including a calcium component such as limestone, a silica component, an alumina component, and fluxing agents (typically iron), which are used to lower clinkering temperatures of reaction, which reduces fuel consumption. Raw materials are carefully proportioned and fed into the in-line raw mill where the feed materials are blended and sized. As materials exit the raw mill, they are captured in static separators or in a baghouse. These captured materials are then either fed directly into the pyro-process, or stored in intermediate storing in raw meal (blending) silo, to be fed later. Exhaust air leaving the baghouse is routed to the main kiln stack where it exhausts as a dust-free airstream.

Raw meal is fed into the top of the preheater tower where materials, flowing counter-current to hot gases exiting the kiln and calciner. This material gains heat as it progresses through the different stages (cyclones) of the preheater. Gases exiting the preheater are routed to the in-line raw mill (described above) during mill grinding operations, or bypassing the raw mill during 'Mill-Down' operations. Whether routed through the raw mill or not, these gases eventually pass through the main kiln baghouse for dust removal, then exit at the kiln stack. Gases exiting the preheater can be cooled in the conditioning tower, generally to protect equipment and filter media, and to reduce fan power requirements.

Materials exit the bottom of the preheater and enter the precalciner (some cement processes do not include a precalciner). Materials are heated to calcination temperature where calcium carbonate is converted with heat, to calcium oxide (lime) and carbon dioxide. This is an energy-intensive chemical reaction.

After the calciner, material enters the rotary kiln where the clinkering reactions occur. Calcium oxide chemically combines with silica to form tri-calcium silicate ($C_3S$) and di-calcium silicate ($C_2S$). Calcium oxide combines with alumina to form tri-calcium silicate ($C_3A$). Calcium oxide, alumina and iron combine to form Tetra-calcium alum inoferrite ($C_4AF$). Clinker is usually round in shape of varying size, but typically the size of a golf ball. Fuel is fired at the calciner and/or at the main burner at the rotary kiln discharge. A variety of fuels can be used, with coal being one of the most common.

After the clinkering reaction, hot clinker spills into the clinker cooler, which serves two primary purposes, cool the product and recover heat back into the process. Ambient air is typically used with cooler fans to recover this heat. Clinker is then combined and inter-ground with additives such gypsum, to form cement, which is sold in bulk or bags to customers.

Hence, it can be seen that various embodiments of the present invention provide systems, processes, and modules for baghouses with dynamically selectable and reconfigurable polishing and non-polishing operations that can be used for example in conjunction with a cement manufacturing plant or facility to control emissions.

Various examples, embodiments, features, process operations, and functions have been described herein, and it is understood that various embodiments of the present invention can be formed by combining one or more of the various features, examples, process operation(s) and/or functions disclosed herein.

While the methods disclosed herein have been described and shown with reference to particular operations performed in a particular order, it will be understood that these operations may be combined, sub-divided, or re-ordered to form equivalent methods without departing from the teachings of the present disclosure. Accordingly, unless specifically indicated herein, the order and grouping of the operations is not a limitation of the present disclosure.

It is understood that the directional references provided herein, such as top, bottom, upwards, downwards, clockwise, counterclockwise, left, right, and the like, are provided to describe examples of the embodiments disclosed herein, and are not intended to be limiting.

It should be appreciated that in the foregoing description of exemplary embodiments of the disclosure, various features of the disclosure are sometimes grouped together in a single embodiment, Figure, or description thereof for the purpose of streamlining the disclosure and aiding in the understanding of one or more of the various aspects. This method of disclosure, however, is not to be interpreted as reflecting an intention that the claims require more features than are expressly recited in each claim. Rather, inventive aspects lie in less than all features of a single foregoing disclosed embodiment, and each embodiment described herein may contain more than one inventive feature.

While the disclosure is presented and described with reference to embodiments thereof, it will be understood by those skilled in the art that various other changes in the form and details may be made without departing from the spirit and scope of the disclosure.

What is claimed is:

1. A method for dynamically selecting polishing and non-polishing operations in a baghouse apparatus, the method comprising:

receiving first air flow through a conduit;
    determining that a component of the incoming first air flow exceeds a predetermined criteria;
    in response to determining that the component of the incoming first air flow exceeds the predetermined criteria:
        configuring a first baghouse section and a second baghouse section in the polishing operation; and
        operating the baghouse apparatus in the polishing operation, wherein the polishing operation comprises operating the first baghouse and the second baghouse in series;
    receiving a second air flow through the conduit;
    determining that the component of the incoming second air flow fails to exceed the predetermined criteria;
    in response to determining that the component of the incoming second air flow fails to exceed the predetermined criteria:
        configuring the first baghouse section and the second baghouse section in the non-polishing operation; and
        operating the baghouse apparatus in the non-polishing operation, wherein the non-polishing operation comprises operating the first baghouse and the second baghouse in parallel; and
    switching configurations of the first and second baghouse in response to the controller detecting that the component of the incoming first air flow changes and either no longer exceeds the predetermined criteria or is below the predetermined criteria.

2. The method of claim 1, further comprising injecting activated carbon into the second baghouse section when configured in a series configuration.

3. The method of claim 1, wherein the component is an emission level.

4. The method of claim 1, wherein configuring the first baghouse section and the second baghouse section comprises actuating one or more valves in a set of valves using a controller.

5. The method of claim 1, wherein the switching step comprises automatically actuating at least one valve of a set of valves.

6. The method of claim 1, wherein the predetermined criteria is an acceptable level of emission.

* * * * *